US008347103B2

(12) United States Patent
Jones et al.

(10) Patent No.: US 8,347,103 B2
(45) Date of Patent: Jan. 1, 2013

(54) SYSTEM AND METHOD FOR AUTHENTICATING A USER USING A GRAPHICAL PASSWORD

(75) Inventors: Nolan Jones, Overland Park, KS (US); J. D. Sherry, Olathe, KS (US)

(73) Assignee: NIC, Inc., Olathe, KS (US)

( * ) Notice: Subject to any disclaimer, the term of this patent is extended or adjusted under 35 U.S.C. 154(b) by 555 days.

(21) Appl. No.: 12/352,928

(22) Filed: Jan. 13, 2009

(65) Prior Publication Data

US 2010/0180336 A1    Jul. 15, 2010

(51) Int. Cl.
*G06F 21/00* (2006.01)
(52) U.S. Cl. ............ 713/184; 713/183; 726/19; 726/27; 726/28
(58) Field of Classification Search .................. None
See application file for complete search history.

(56) References Cited

U.S. PATENT DOCUMENTS

| | | | |
|---|---|---|---|
| 5,127,043 A | 6/1992 | Hunt et al. | |
| 5,559,961 A * | 9/1996 | Blonder | 726/18 |
| 5,721,765 A | 2/1998 | Smith | |
| 5,953,700 A | 9/1999 | Kanevsky et al. | |
| 6,278,453 B1 | 8/2001 | Bodnar | |
| 6,686,931 B1 | 2/2004 | Bodnar | |
| 6,720,860 B1 * | 4/2004 | Narayanaswami | 340/5.54 |
| 6,721,738 B2 | 4/2004 | Verplaetse et al. | |
| 6,861,946 B2 | 3/2005 | Verplaetse et al. | |
| 6,934,860 B1 * | 8/2005 | Goldstein | 713/183 |
| 6,980,081 B2 * | 12/2005 | Anderson | 340/5.53 |
| 7,073,067 B2 | 7/2006 | Mizrah | |
| 7,174,462 B2 | 2/2007 | Pering et al. | |
| 7,243,239 B2 * | 7/2007 | Kirovski et al. | 713/184 |
| 7,266,693 B1 | 9/2007 | Potter et al. | |
| 7,280,970 B2 | 10/2007 | Tamir et al. | |
| 7,392,188 B2 | 6/2008 | Junkawitsch et al. | |
| 7,921,454 B2 * | 4/2011 | Cerruti et al. | 726/5 |
| 2001/0023413 A1 * | 9/2001 | Fukuma et al. | 705/27 |
| 2002/0029341 A1 * | 3/2002 | Juels et al. | 713/184 |
| 2002/0130835 A1 | 9/2002 | Brosnan | |
| 2004/0010722 A1 * | 1/2004 | Ha | 713/202 |
| 2004/0230843 A1 * | 11/2004 | Jansen | 713/202 |
| 2004/0260955 A1 | 12/2004 | Mantyla | |
| 2005/0144484 A1 * | 6/2005 | Wakayama | 713/202 |
| 2006/0168253 A1 | 7/2006 | Baba et al. | |
| 2006/0206717 A1 * | 9/2006 | Holt et al. | 713/182 |

(Continued)

OTHER PUBLICATIONS

Alsulaiman et al., "Three-Dimensional Password for More Secure Authenticaiton," 2008, IEEE, pp. 1929-1939.*

(Continued)

*Primary Examiner* — Luu Pham
(74) *Attorney, Agent, or Firm* — Mark C. Young; Stinson Morrison Hecker LLP

(57) ABSTRACT

The present invention is directed to a system and method for authenticating a user of a device or computer system using a graphical password. In an exemplary embodiment, a user is presented with a plurality of graphical images on a display screen of an access device, such as a handheld smart phone. Each graphical image includes one or more associated attributes. The user sequential selects graphical images and a password is generated based on the combination of attributes of the selected images. The generated password is compared with a stored password to authenticate the user and grant access to the device. In another aspect, the graphical password includes time, motion, and/or keyboard input attributes such that the password is multidimensional.

13 Claims, 5 Drawing Sheets

U.S. PATENT DOCUMENTS

| | | | |
|---|---|---|---|
| 2006/0206918 A1* | 9/2006 | McLean | 726/2 |
| 2006/0218627 A1* | 9/2006 | Komatsu | 726/5 |
| 2007/0143117 A1 | 6/2007 | Conley | |
| 2007/0198267 A1 | 8/2007 | Jones et al. | |
| 2007/0266428 A1* | 11/2007 | Downes et al. | 726/5 |
| 2007/0277224 A1* | 11/2007 | Osborn et al. | 726/2 |
| 2008/0098464 A1* | 4/2008 | Mizrah | 726/5 |
| 2008/0209526 A1 | 8/2008 | Varghese et al. | |
| 2009/0106825 A1* | 4/2009 | Cerruti et al. | 726/5 |
| 2009/0115644 A1* | 5/2009 | Hsieh | 341/23 |
| 2009/0199295 A1* | 8/2009 | Shih et al. | 726/18 |

OTHER PUBLICATIONS

Suo et al., "Graphical Passwords: A Survey," 2005, IEEE, pp. 1-10.*

Dhamija et al., "Deja Vu: A User Study Using Images for Authentication," in Proc. 9th USINEX Security Symp., Denver, CO, Aug. 2000, pp. 45-58.*

Wiedenbeck et al., "Authentication Using Graphical Passwords: Basic Results," in Proc. Human-Comput. Interaction Int., Las Vegas, NV, Jul. 2005, pp. 1-10.*

Murali, J., "Passface Instead of Password", *The Hindu*, printed off the internet from www.thehindu.com/thehindu/biz/2002/01/10/stories/2002011000260100.htm, published on Jan. 10, 2002, printed from internet on Oct. 22, 2008.

Dhamija, R. et al., "Deja Vu: A User Study Using Images for Authentication", SIMS/CS, University of California Berkeley, USENIX Security Symposium, Proceedings of the 9th conference on USENIX Security Symposium—vol. 9, Denver, Colorado, 2000.

"A Picture is Worth a 1000 Words. VisKey for Pocket PC.", SFR Software: PDA Software & Mobile Solutions, printed off the internet from http://www.sfr-software.de/cms/EN/pocketpc/viskey/ on Oct. 22, 2008.

* cited by examiner

= PASSWORD

SYSTEM AND METHOD FOR AUTHENTICATING A USER USING A GRAPHICAL PASSWORD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to systems and methods of authenticating users of devices and computer systems and restricting access to those devices and computer systems (and associated data) to authorized users. More particularly, the system and method of the present invention allow a user to enter a password by selecting graphical images presented on a display screen of an access device, with attributes of those selected images used to generate a password that authenticates the user and determines access authorization.

Security of data is an ongoing concern in any business that employs computers to store data or run applications that must be accessed by various users. Many businesses have expanded to allow customer access over the Internet, with consumers able to bank, buy tickets, access email, and purchase items from numerous online merchants, all using online access to computer systems operated by those businesses. Because of security concerns (of both the consumer and the businesses), various security measures are typically employed to ensure the security of the computer system and to ensure that only authorized users have access to the data and applications on the system. Common security measures include the use of passwords by the users to verify their authorization to access the computer system and encryption of stored and/or transmitted data.

While these known security measures have been generally successful in securing customer data and preventing access by unauthorized users, they also suffer from numerous drawbacks. Password protection, in particular, has evolved from old technology in which a user entered letters and numbers on terminal or computer keyboard directly into the device being accessed. With the advent of new technology, these traditional password entry methods have become cumbersome and do not take advantage of technological changes, such as have occurred in the areas of touch screens, handheld devices, smart phones and the like.

SUMMARY OF THE INVENTION

The present invention is directed to a system and method for authenticating a user using a graphical password. In an exemplary embodiment, a user is presented with a plurality of graphical images on a display screen of an access device, such as a handheld smart phone. Each graphical image includes one or more attributes associated with the image. Using a stylus, fingertip, trackball, joystick, keyboard, or other input apparatus, the user sequentially selects graphical images and a password is generated based on the attributes of the selected images. The generated password is compared with a stored password to authenticate the user and grant access to the device. In another aspect, the graphical password includes time, motion, and/or keyboard input attributes such that the password is multidimensional, with sensors on the access device providing the additional attributes.

In another exemplary embodiment, the access device is used to connect with a remote computer system and the generated password is transmitted to the remote computer system to authenticate the user and allow access to the remote computer system. In alternative embodiments of the remote computer access embodiment, the graphical images may be stored on the user's computer (i.e., client-side), or may be stored on the remote computer system (i.e., server side).

Other variations and exemplary embodiments are also presented.

DETAILED DESCRIPTION OF EXEMPLARY EMBODIMENTS OF THE INVENTION

The present invention is directed to a system and method for authenticating a user using a graphical password. While the invention will be described in detail below with reference to several exemplary embodiments and exemplary methods, it should be understood that the invention is not limited to the specific system configurations or methodologies of these embodiments. For example, although the system and method are described primarily in the context of access to handheld devices and access to remote computer systems (i.e., client/server arrangements), the invention could equally be used in connection with various other types of systems requiring password entry, such as alarm systems, building access systems, and the like. In addition, although the exemplary embodiments are described as embodying several different inventive features, one skilled in the art will appreciate that any one of these features could be implemented without the others in accordance with the invention.

First Exemplary Embodiment

Figure 1:
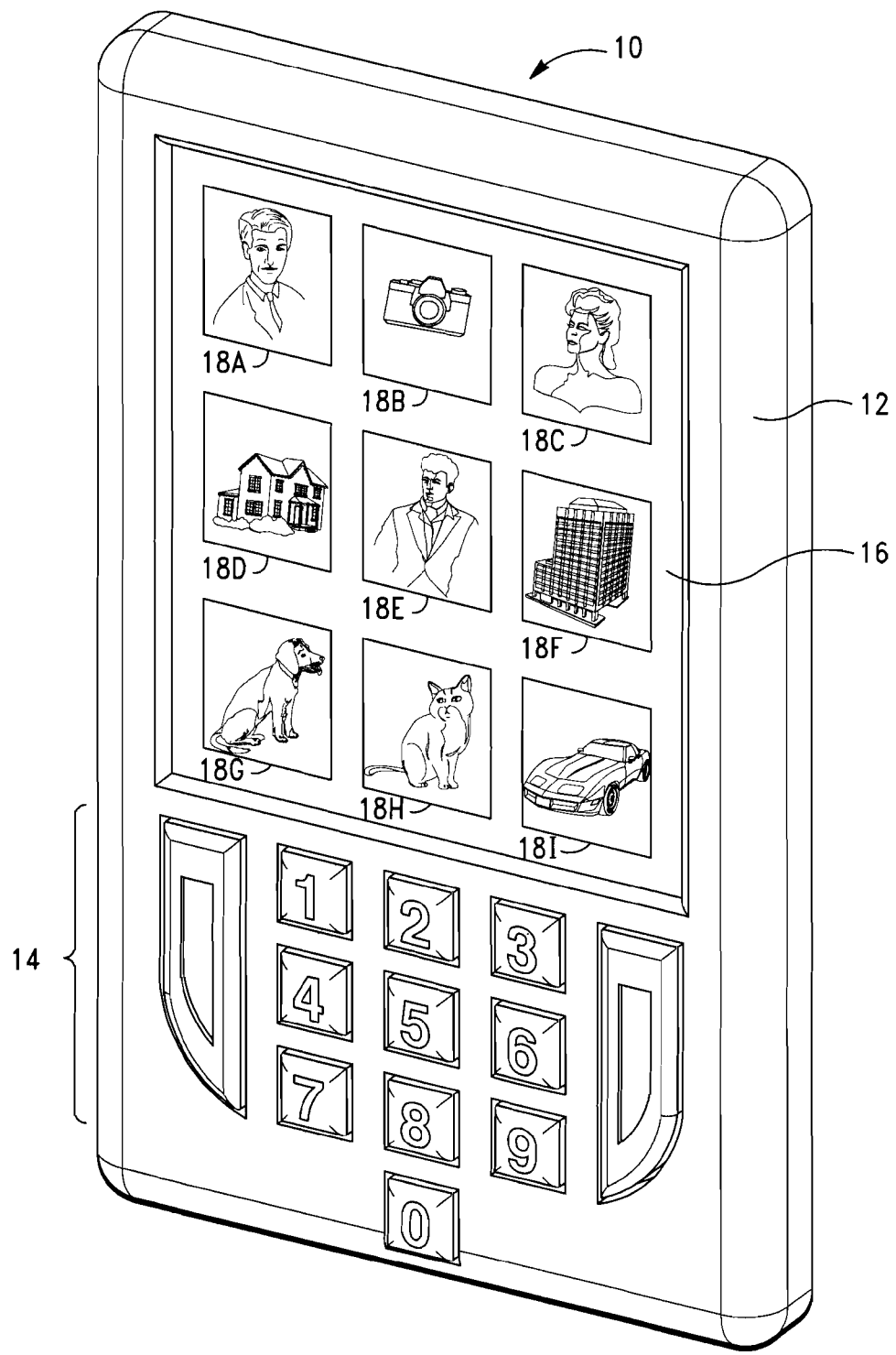
FIG. 1 is a perspective view of a handheld device in accordance with a first exemplary embodiment of the present invention.

Referring to FIG. 1, an exemplary handheld device for allowing a user to generate a password using graphical images in accordance with the present invention is shown generally as reference numeral 10. Device 10 includes a case 12 configured to be held in the hand of a user, and further includes a keyboard 14 for data entry and a display screen 16 operable to display information to the user. Display screen 16 is preferably a touch sensitive screen, or "touch screen" that is further operable to detect contact with the screen to allow a user to interact with the device using a stylus or fingertip to choose or select information and images presented on the screen 16. In a preferred embodiment, device 10 is a handheld smart phone device, such as an Apple® iPhone®, a Palm® Treo®, a Windows Mobile® device, or other similar smart device as is known in the art. Note that while keyboard 14 of this exemplary is depicted as a numeric-only keypad such as would be present on a telephone device, the present invention may equally be embodied in devices having full QWERTY keyboards (whether slide-out or front-mounted), in devices having only virtual keyboards (i.e., keyboards displayed on the device's touch screen), or in devices having no keyboard capabilities and only a touch screen for interaction with the user.

Figure 2:
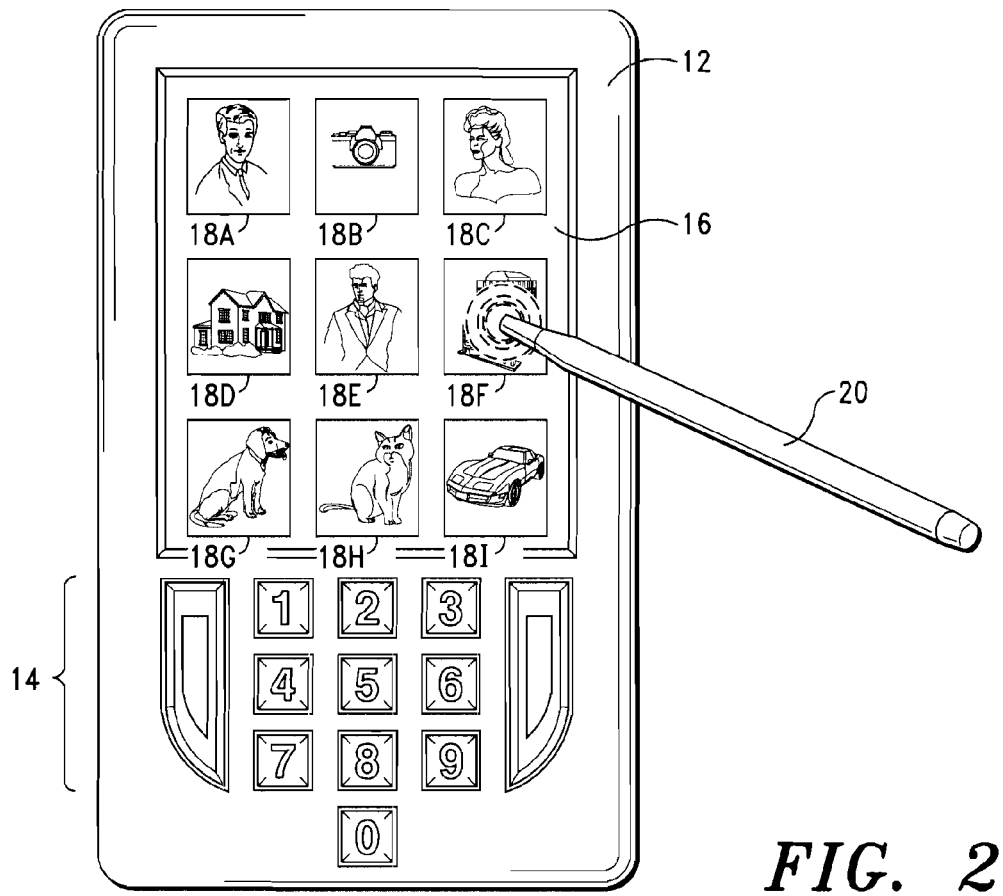
FIG. 2 is a front view of the device of FIG. 1 in use with a stylus.
Figure 3:
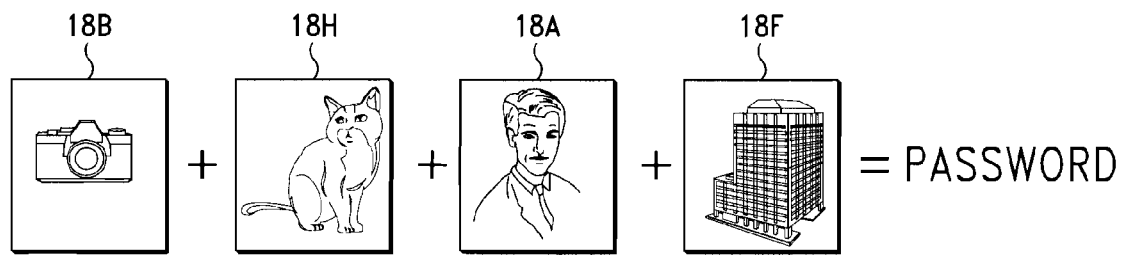
FIG. 3 is a block diagram of graphical password entry in accordance with a first exemplary method of the present invention.

Looking to FIGS. 2 and 3, a method of entering a graphical password using device 10 is depicted in accordance with an exemplary method of the present invention. For purposes of this exemplary method, the password entry described is used to unlock the device to allow the user to access the device itself to place calls or access data stored on the device. However, as will be described in more detail hereinbelow, the graphical password entry method of the present invention may also employ the device to acquire a password from the user with that password then transmitted by the device to a remote computer system for authentication and access, such as when a user is accessing a bank account using the handheld device. Thus, the exemplary method as described may be used to enable local access to a device (such as a smart phone or local computer system), or may be used to transmit a generated password to a remote computer systems (e.g., accessing a bank website employing the exemplary method through a handheld smart phone).

As depicted in FIG. 2, the device presents a plurality of graphical images 18A-18I to a user by displaying those graphical images on the touch screen display 16. The graphical images are preferably photographs that are stored in memory or other storage medium in the device, such as flash memory or a hard drive. Preferably, the images have been acquired by the user using a camera integrated in the device, or have been loaded or otherwise transferred onto the device by the user. The graphical images are preferably digital photographs, although any graphical images such as icons, drawings, etc. may be used.

Each graphical image comprises a data file that includes the image data allowing the graphical image to be displayed (such as .jpg or .bmp format data), as well as one or more attributes associated with that image. The attributes associated with an image may be arbitrary, such as an arbitrary numerical and/or letter value assigned to the image (e.g., "4747674982122183" is assigned to a first image, "5mb89457re9325tr1" is assigned to a second image, and so forth), or may be any other arbitrary combination of numbers, letters, and/or characters. In addition, an attribute of an image may be a non-arbitrary value associated with the image, such as the filename given by the user to the image's data file, or a checksum or other value calculated from information stored within the image data (e.g., a checksum calculated from the numeric values of the .bmp data in the image). Images may be associated with one or more such attributes, and the method of the present invention may use any combination of the attributes from the images to generate a password as will be described in more detail below.

Looking still to FIG. 2, presented with the graphical images as just described, a user, using a stylus 20 or fingertip, sequentially selects images from those presented by pressing those images in a specific order to generate a password. In this first example, as depicted in FIG. 3, the user selects four graphical images (18B, 18H, 18A, and 18F) in the order depicted. The attributes associated with those images are combined to generate a password that is then authenticated by the device. For example, if images 18B, 18H, 18A, and 18F have associated numerical attributes of "3", "6", "2", and "8", respectively, the generated password upon selecting the images in that order would be "3628". Of course as described above, for security purposes the numerical attributes for each image are preferably much longer to avoid anyone guessing the values of each, and may include characters and symbols in addition to the numbers. Additionally, as described above, each image may have more than one attribute that contributes to the generated password. For example, if (in addition to the numerical values just described) images 18B, 18H, 18A, 18F have checksum values of 0x32, 0x48, 0xF3 and 0xED, respectively, the generated password for the user's selection of those images selected in that order would be 3+0x32+6+0x48+2+0xF3+8+0xED (i.e., the value and checksum for each image, in sequence). Note that in this example the "+" symbol indicates concatenation of the attributes to form a string of characters/numbers/symbols comprising the password. As should be apparent to those skilled in the art, each graphical image may have numerous associated attributes, and any combination of those attributes may be incorporated in generating a password.

Upon completion of selection of images by the user, the generated password is compared to a stored password on the device. That stored password has preferably been created by the user during a set-up or initialization routine wherein the user first generated the password in a manner similar to that as just described. Alternatively, the device can automatically generate the stored password by randomly selecting an ordering of graphical images during a set-up or initialization routine and presenting that password to the user for memorization and later use to access the device. If the generated password matches the stored password the device is unlocked and the user is allowed access to the device to make calls and access data stored on the device. If the generated password value does not match the stored password value, then access to the device is denied.

Note that while this exemplary method describes sequentially selecting just four graphical images, the present invention encompasses the use of a fewer or greater number of images to generate a password as desired by the user. In addition, while the exemplary method depicts the selection of four distinct graphical images, images may be selected and used more than once in a single password. For example, a password could be generated from the sequential selection of graphical images 18A, 18B, 18C, 18A, and 18C (where images 18A and 18C are each selected more than once). Furthermore, while the exemplary method as described displays nine graphical images on the device's screen simultaneously, there could be more or fewer images displayed at a time, or the images could be displayed full-screen, one at a time, with the device sequentially displaying the images and the user selecting the appropriate image as it is displayed. These variations are contemplated by, and within the scope of, the present invention.

For simplicity, in the exemplary method just described the password is generated upon the user completing the sequential selection of four images (i.e., the password is automatically generated and compared to the stored password immediately upon the user pressing the fourth sequential image). Other variations of this implementation will be apparent to those skilled in the art, and are within the scope of the present invention. For example, the device could, in addition to the displayed graphical images, display an "ENTER" button that allows the user to affirmatively select when he or she has completed entry of the password, or a physical key in the keypad 14 could be used to enter and submit the password to the device. In addition, the device could include displayed buttons (or physical keys on keypad 14) to allow the user to "backspace" through the selected graphical images in the case of an errant entry. In other alternative embodiments, the device could provide a fixed amount of time in which the user needs to select the images, with any images selected in that time period being used to generate a password. These and other alternatives and variations are contemplated by the present invention.

In another embodiment of the method just described, keys on the keypad 14 of the device are correlated to graphical images displayed on the display screen so that the user can select the graphical images on the screen without using the touch screen. For example, on the device shown in FIG. 2, the 1 through 9 numeric keys are correlated with displayed graphical images 18A through 18I, respectively, so that pressing a numeric key on the keypad 14 would select the corresponding graphical image. Thus, pressing the "1" key selects image 18A, pressing the "3" key selects image 18C, and so forth.

In another embodiment of the method just described, the device displays "false" (i.e., non-user) graphical images interspersed with the actual user-supplied images. The false images include attributes that do not correlate with any of the actual attributes of the actual images, or include no attributes to contribute to the generated password. Thus, if a user selects one of the false graphical images as part of the generated password, that generated password will not match the stored password on the device and access to the device will be denied.

In another embodiment, the order of the images on the display is random, with the device randomly placing the graphical images in a position on the display screen. In yet another embodiment, the user can instigate a random re-ordering of the graphical images by pressing a key on the device, or by shaking the device to activate one or more motion sensors in the device (as will be described in more detail below) which instigates the re-ordering.

In other alternative embodiments as will now be described, the selection of graphical images can be combined with other data or inputs to the device to generate a multi-dimensional password comprising those cumulative inputs.

Figure 4:
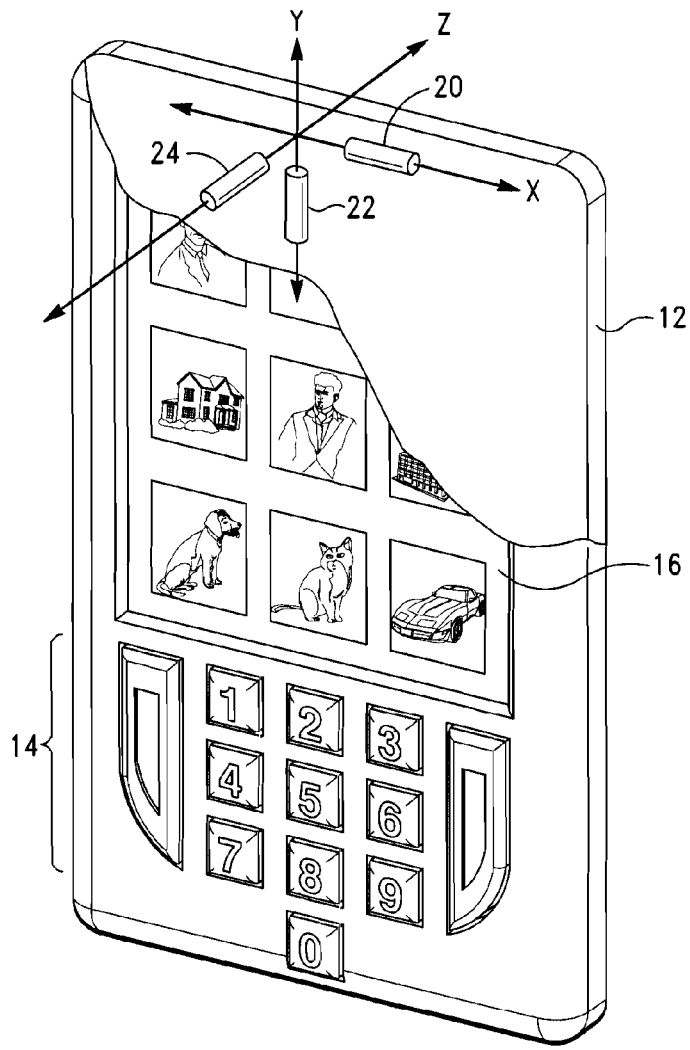
FIG. 4 is a cut-away view of the device of FIG. 1 showing motion sensors within the device.

Looking to FIG. 4, a cutaway view of device 10 of FIG. 1 is depicted. As seen in this figure, device 10 includes three motion sensors 20, 22, 24 positioned within the device. Each motion sensor is operable to detect motion in a specific axis, and to transmit data corresponding to detected motion in that axis to the device. Sensor 20 is operable to detect motion in the horizontal "x" axis (i.e., side-to-side motion), sensor 22 is operable to detect motion in the vertical "y" axis (i.e., up and down motion) and sensor 24 is operable to detect motion in the "z" axis (i.e., fore and aft motion). Each sensor preferably provides data to the device independently of the other sensors, with the device thus able to receive data corresponding to movement in any axis, or in multiple axes simultaneously (e.g., if the device is moved up and to the right simultaneously). Preferably, sensors 20, 22, 24 are accelerometers, although any other type of movement-sensing devices known in the art may be used and are within the scope of the present invention. Sensors 20, 22, 24 may be separate, discrete devices, may be integrated into a single device providing a single output or data stream to the handheld device. Most preferably, the sensors are an integral part of handheld device 10. These and other variations will be apparent to those skilled in the art and are within the scope of the present invention.

Figure 5:
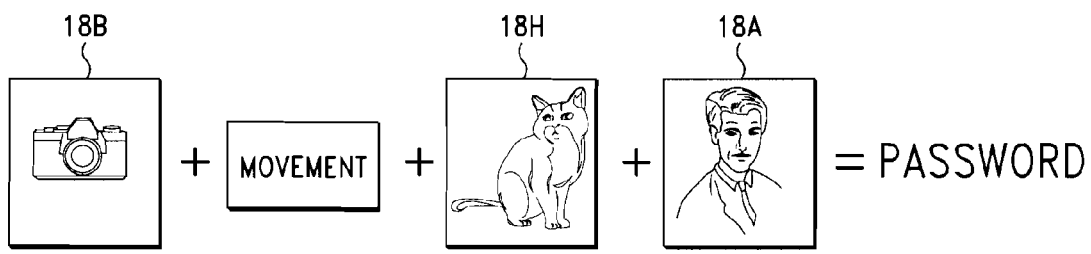
FIG. 5 is a block diagram of multi-dimensional graphical password entry in accordance with a second exemplary method of the present invention.

In another exemplary embodiment, with the sensors 20, 22, 24 providing motion data to the device 10, that data is incorporated as a component of the generated password, or multi-dimensional password. With sensors 20, 22, 24 providing data corresponding to the axis of movement (e.g., "X", "Y", or "Z") and a rate of movement or acceleration within that axis (e.g., "1" for a rate of 1 meter/second/second, "2" for a rate of 2 meters/second/second, etc.) that data is incorporated as a component of the generated password. Thus, for example, a movement of the device in the "x" axis at a rate of 1/meter/second/second would result in data generated by the sensor of "X1". Looking to the exemplary password generated as depicted in FIG. 5, the user selects image 18B, moves the device (in the "x" axis at 1 meter/second/second), selects image 18H, then selects image 18A. The generated password would thus incorporate the "X1" attribute of the motion sensor with the attributes of images 18B, 18H, and 18A. Using the numerical attributes associated with those images as described in the previous example, the generated password would be "3"+"X1"+"6"+"2" (i.e., the numerical attribute of image 18B, the motion attribute, the numerical attribute of image 18H, and the numerical attribute of image 18A). The generated password is then compared to the stored password to authenticate the user as described previously. Note that in the exemplary method just described, the numerical values and motion sensor data formats are simplified for clarity in explaining the method of generating the password. The actual format of the motion attribute (and the length of the numerical attribute, as discussed previously) would be a standardized format provided by the sensors.

Furthermore, with respect to motion attributes and time attributes (as will be discussed below), the password authentication routine that compares the generated password to the stored password preferably includes a tolerance such that those attributes in the generated password need not exactly match the value for that attribute in the stored password, but only be within an allowable variation (i.e., tolerance) from the stored value for the corresponding motion and/or time attributes. Thus, if the stored password includes an "X1" attribute as the motion component of the password (corresponding to a movement in the "x" axis at a rate of 1 meter/second/second as previously described), then any movement within a predetermined tolerance of that value may be considered a match for that component. For example, any "x" axis acceleration in the range of 0.9 to 1.1 meters/second/second may be accepted as a match for an expected value of 1 meter/second/second. Thus, for motion and time components of the generated password, the user need only come reasonably close to the stored password value for that component.

Figure 6:
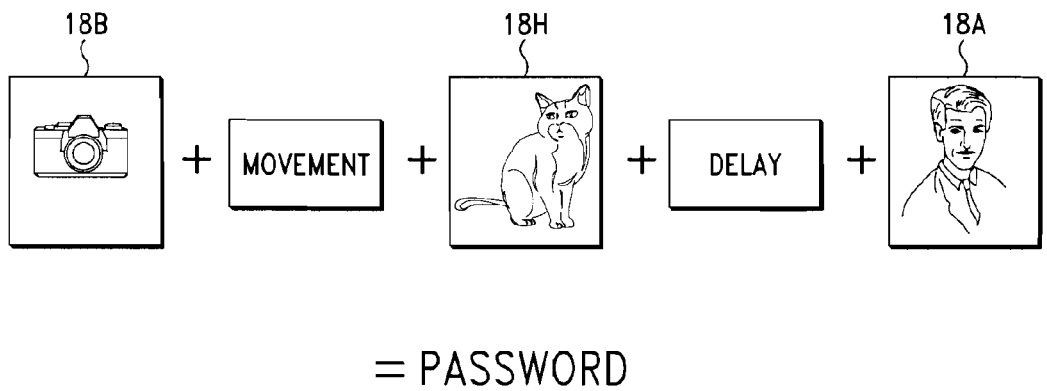
FIG. 6 is a block diagram of multi-dimensional graphical password entry in accordance with a third exemplary method of the present invention.

Looking to FIG. 6, an alternative embodiment of the method just described is depicted. As shown in the block diagram, in addition to the sequential selection of graphical images by the user and the movement of the device as just described, the elapsed time between the selection of one or more of the graphical images by the user is incorporated as a component of the generated password. In the example shown in FIG. 6, the time delay between the user selecting image 18H and the user selecting image 18A is recorded by the device and incorporated into the password. Thus, in the example shown and using the same numerical value attributes for the images 18B, 18C, and 18D as described above, and the "x" axis motion component as described above, and assuming the time between the user pressing image 18H and image 18A is two seconds, the generated password would be "3" (the numerical value attribute of image 18B)+"X1" (movement in the "x" axis)+"6" (the numerical value attribute of image 18H)+"2" (a two second delay)+"2" (the numerical value attribute of image 18A). As with the motion component described previously, the data recorded for the time component is preferably in a standardized format, the integer "2" value described in the exemplary method is simplified for clarity. Likewise, as with the motion component, the password authentication routine comparing the generated password to the stored password preferably includes a predetermined tolerance for the time component so that the user need only be reasonably close to the stored value of the time component for that component to be considered a match. For example, if the value of the time component of the stored password is "2" (corresponding to two seconds), then any time between 1.8 and 2.2 seconds would be considered a match for purposes of that component.

As will be apparent to those skilled in the art, variations on the number of graphical images included in the password and variations in the inclusion of keyboard, motion, and time components are contemplated by the present invention. For example, a generated password may require the selection of multiple graphical images, with keyboard, motion and time components between each image selection, may require only the selection of graphical images, or may require any combination of the various input components.

Second Exemplary Embodiment

Figure 7:
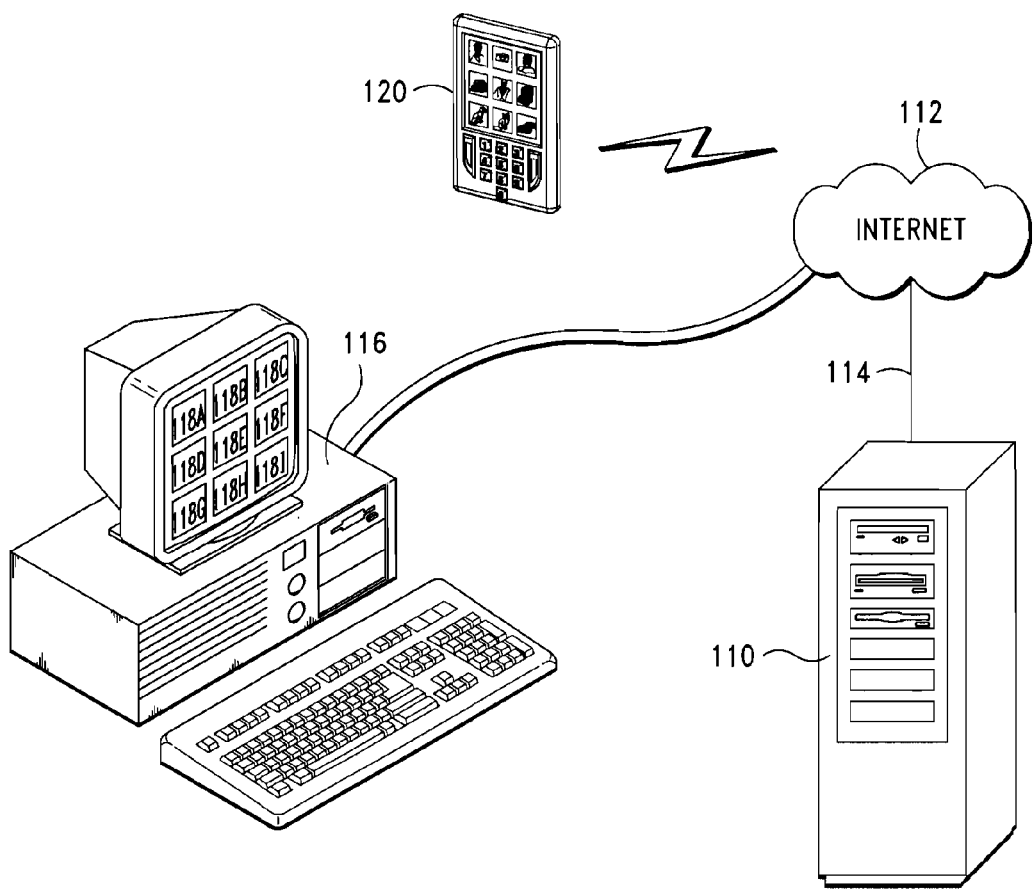
FIG. 7 is a perspective view of a client-side remote computer access system in accordance with a second exemplary embodiment of the present invention.

Referring to FIG. 7, in a second exemplary embodiment of the present invention, the exemplary method of the present invention is used to authorize user access to a remote computer system. As depicted in FIG. 7, a remote computer system 110 is connected to the Internet 112 via link 114. Remote computer system 110 may include a server, and may comprise multiple servers at multiple geographic locations as is known in the art. The remote computer may be hosted by a business with which the user has an account, such as a bank, merchant, or Internet service provider. Using the graphical password entry method as described above, a user can access the remote computer system using a handheld device 120 or personal computer 116 and transmit a generated password to obtain access to the remote computer system (e.g., access a bank account, email account, etc.)

With the user having previously generated a password (in a manner similar to that previously described above with respect to the handheld device), that password is stored on the remote computer system. In this embodiment (i.e., a client configuration) the graphical images and associated attributes remain on the user's handheld device 120 or personal computer 116, with only the stored password residing at the remote computer system.

Looking first to accessing the remote computer system 110 using the handheld device 120, a user desiring access to the remote computer system (such as a bank account website, email account, etc.) accesses the website or URL associated with the remote computer system using the features of the handheld device, such as cellular or wireless Internet access provided by telephone carriers. Upon entry of a username or other unique identifier identifying the user, the remote computer requests entry of the user's password. In a manner similar to that described above, the handheld device displays graphical images on its display and the user sequentially selects the images that form the password. As also described above, the generated password may also incorporate keyboard, time, and/or movement components in a multi-dimensional password. Upon completion of password entry by the user, the generated password is transmitted to the remote computer system (preferably over an encrypted link) where the generated password is compared with the stored password. If the passwords match, the remote computer system grants access to the user's account, if not, access is denied. As discussed previously, a "match" with respect to time and motion components of the password may allow a predetermined variation in the data and still be considered a match.

Looking next to accessing remote computer system 110 using a personal computer 116, a user desiring access to the remote computer system accesses the website or URL associated with the remote computer system using the communication features of the personal computer, such as Internet access using a Web browser. Upon entry of a username or other unique identifier identifying the user, the remote computer requests entry of the user's password. In a manner similar to that described above, the personal computer displays the user's graphical images on its display and the user sequentially selects the images that form the password using the keyboard (with keys correlating to specific graphical images), a mouse, or a touch screen. As described above with respect to the handheld device, the password may incorporate keyboard and time components.

In addition, a motion sensor device (incorporating motion sensing circuitry as described above with respect to the handheld device of the first embodiment) may be connected to the computer to allow a user to input a motion component to the password. Thus, the personal computer 116 may generate a multi-dimensional password similar to that generated by the handheld device. Upon completion of entry of the password, the generated password is transmitted to the remote computer system (preferably over an encrypted link) and the generated password is compared with the stored password. If the generated password and stored password match, the remote computer system grants access to the user's account, if not, access is denied. As discussed previously, a "match" with respect to time and motion components of the password may allow a predetermined variation in the data and still be considered a match Thus, the method of the present invention may be used in a client-sided environment to provide graphical and multi-dimensional password generation and user authentication.

Third Exemplary Embodiment

Figure 8:
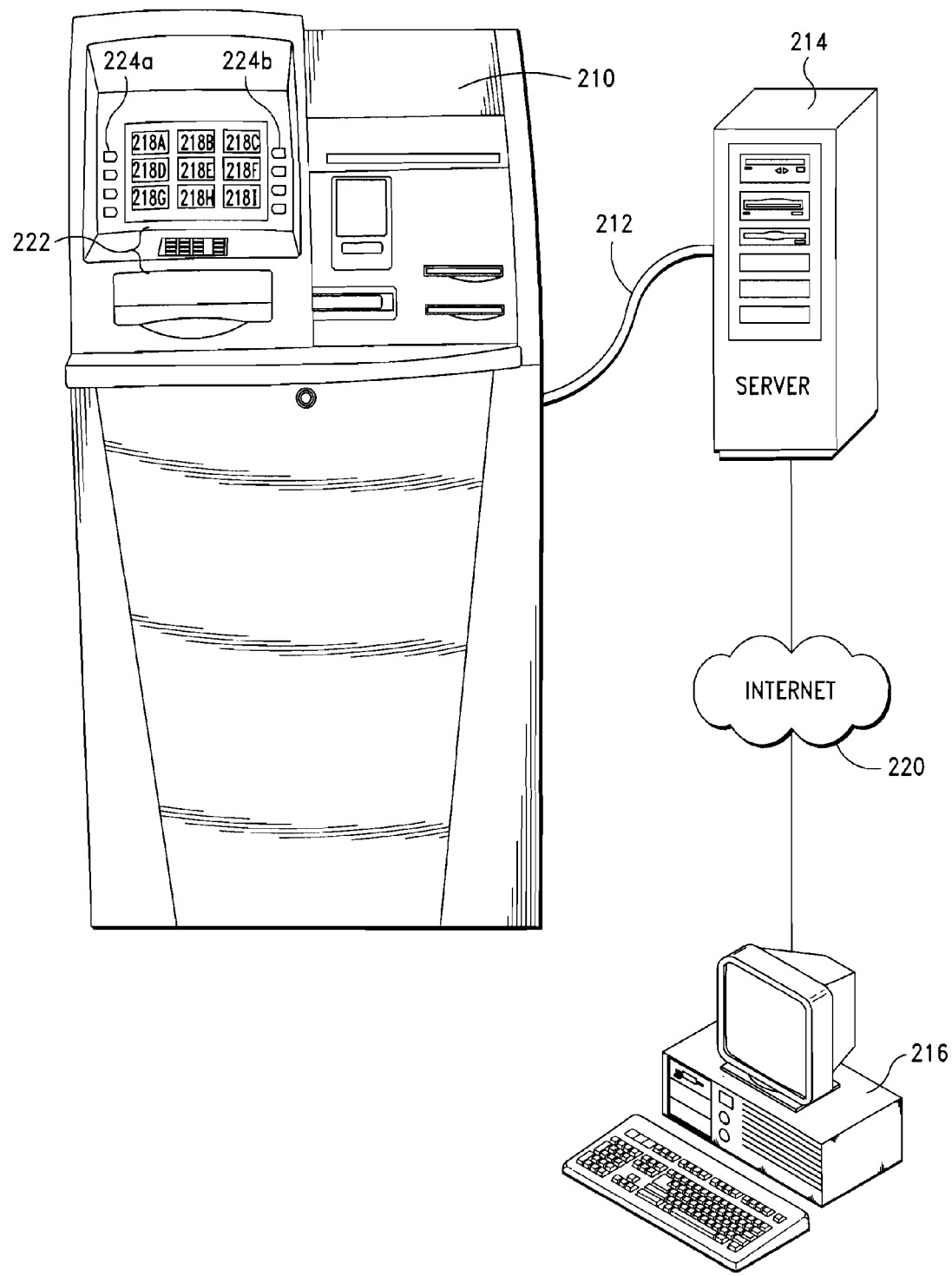
FIG. 8 is a perspective view of a server-side ATM device in accordance with a third exemplary embodiment of the present invention.

In a third exemplary embodiment of the present invention, the graphical password generation method previously described is used to allow user access to a secure sever-based system, such as an automated teller machine (ATM) system. As depicted in FIG. 8, an ATM 210 is connected via a secure data link 212 to a remote secure server 214 operated by a bank or network of banks. A user, having an ATM-accessible account with the bank uploads or transfers graphical images (with associated attributes) to the secure server 214. This transfer may take place through the user's personal computer 216 accessing the user's account hosted on the bank's server through the Internet 220, or may take place in the bank with the user providing the bank with the graphical images. Also stored on the secure server 214 is a stored password, generated in a manner similar to that described above.

With the graphical images (and associated attribute) and stored password residing on the secure server 214, the method of the present invention is used to authenticate a user of the ATM 210 and grant access to the user's accounts accessible through the ATM. Looking to FIG. 8, a user desiring access to the ATM 210 inserts their ATM card and the data from the card is transmitted to the bank's secure server 214 over secure link 212.

Upon identifying the user (based on data from the ATM card), the remote secure server 214 transmits the user's stored graphical images to the ATM for display on the ATM's touch sensitive display screen as images 218A through 218I. As seen in FIG. 8, the ATM includes keyboard entry devices comprising a numeric keypad 222 positioned below the display screen, with selection keys 224a, 224b positioned along opposite sides of the screen. In a manner similar to that described above for the handheld device, the user selects graphical images to generate a password. As also described above, the generated password may also incorporate keyboard and time input components in a multi-dimensional password. Upon completion of password entry by the user, the generated password is transmitted to the secure system over secure link 212 where the generated password is compared with the stored password. If the passwords match, the remote secure server grants access to the user's ATM account, if not, access is denied. As discussed previously, a "match" with respect to any time components of the password may allow a predetermined variation in the data and still be considered a match.

Thus, the method of the present invention may be used in a server-sided environment to provide graphical and multi-dimensional password generation and user authentication.

While the present invention has been described and illustrated hereinabove with reference to an exemplary embodiment, it should be understood that various modifications could be made to this embodiment without departing from the scope of the invention. Therefore, the invention is not to be limited to the specific embodiment described and illustrated hereinabove, except insofar as such limitations are included in the following claims.

What is claimed and desired to be secured by Letters Patent is as follows:

1. A method for authenticating a user of a computer system operating an access device having a graphical display, a keyboard, and a motion sensor, the method comprising:
presenting a plurality of graphical images on said display wherein each of said plurality of graphical images is associated with a data file comprising image data and at least one attribute unrelated to location of said graphical image on said display;
accepting input from said user sequentially selecting at least two of said graphical images;
accepting motion data corresponding to a movement and a rate of the movement of the access device from the motion sensor;
calculating, by a circuitry of the access device, a delay time between the selecting of at least two of said graphical images;
generating a password comprising attributes associated with each of said selected graphical images, the motion data corresponding the movement of the access device, and the calculated delay time between selecting of at least two of said graphical images;
comparing said generated password to a stored password associated with said user; and
granting said user access to said computer system if said generated password matches said stored password.

2. The method of claim 1, wherein said access device comprises a touch sensitive screen and wherein said selecting said graphical images comprises touching said screen in an area corresponding to said images.

3. The method of claim 1, wherein said is a handheld device and wherein said computer system is integral to said handheld device.

4. The method of claim 1, wherein said computer system is remote from said access device and wherein said method further comprises transmitting said password from said access device to said remote computer system.

5. The method of claim 1, wherein said access device comprises a keyboard for entering data and wherein said selecting said graphical images comprises pressing keys corresponding to said images.

6. The method of claim 1, wherein said access device further comprises a keyboard operable to provide data to said device and wherein said method further comprises accepting input from said keyboard and wherein said generated password comprises data corresponding to said keyboard input data.

7. The method of claim 1, wherein said access device further comprises at least one motion sensor operable to provide data to said device corresponding to a movement of said device and wherein said method further comprises accepting input from said motion sensor and wherein said generated password comprises data corresponding to said motion sensor data.

8. The method of claim 1, wherein said access device further comprises circuitry operable to calculate a delay time between said selecting of at least two of said graphical images by said user and wherein said generated password comprises data corresponding to said delay time.

9. The method of claim 1, wherein said method further comprises storing a plurality of graphical images on said device.

10. The method of claim 1, wherein said method further comprises storing a plurality of graphical images on a remote computer system and transmitting said graphical images to said device for display.

11. An access device for authenticating a user of said device, the access device comprising:
a display screen configured to present a plurality of graphical images to said user, wherein each of said plurality of graphical images is associated with a data file comprising image data and at least one attribute unrelated to location of said graphical image on said display screen;
a circuitry configured to detect selection of at least two of said graphical images by said user;
a motion sensor configured to provide motion data corresponding to a movement and a rate of the movement of the access device;
a circuitry configured to calculate a delay time between the selection of at least two of said graphical images;
a circuitry configured to generate a password comprising attributes from associated with each of said selected graphical images, the motion data corresponding the movement of the access device, and the calculated delay time between the selection of at least two of said graphical images;
a circuitry configured to compare said generated password to a stored password associated with said user; and
a circuitry configured to grant said user access to said device if said generated password matches said stored password.

12. The device of claim 11, wherein said display screen comprises a touch sensitive screen and wherein said selecting said graphical images comprises said user touching said screen in an area corresponding to said images.

13. The device of claim 11, further comprising a keyboard operable to generate data corresponding to a pressed key and wherein said selecting said graphical images comprises pressing a key corresponding to at least one of said images.

* * * * *